（12）United States Patent
Nikitin et al.

(10) Patent No.: US 10,634,618 B2
(45) Date of Patent: Apr. 28, 2020

(54) APPARATUS AND A METHOD FOR INSPECTING A LIGHT TRANSMISSIBLE OPTICAL COMPONENT

(71) Applicant: Hong Kong Applied Science And Technology Research Institute Co. Ltd., Shatin, NT (HK)

(72) Inventors: Vladislav Nikitin, Ma On Shan (HK); Wang Fei Ng, Tseung Kwan O (HK); Ka Kit Wong, Tsing Ying (HK); Xiaozhe Ren, Fanling (HK); Ying Liu, Ma On Shan (HK)

(73) Assignee: Hong Kong Applied Science and Technology Research Institute Company Limited, Shatin (HK)

( * ) Notice: Subject to any disclaimer, the term of this patent is extended or adjusted under 35 U.S.C. 154(b) by 68 days.

(21) Appl. No.: 15/877,638

(22) Filed: Jan. 23, 2018

(65) Prior Publication Data

US 2019/0226997 A1 Jul. 25, 2019

(51) Int. Cl.
*G01N 21/88* (2006.01)
*G01N 21/958* (2006.01)

(52) U.S. Cl.
CPC ....... *G01N 21/8806* (2013.01); *G01N 21/958* (2013.01); *G01N 2021/8825* (2013.01); *G01N 2021/8835* (2013.01); *G01N 2021/9583* (2013.01)

(58) Field of Classification Search
CPC .............. G01N 21/88; G01N 21/8803; G01N 21/8806; G01N 21/896; G01N 21/958; G01N 2021/8809; G01N 2021/8812; G01N 2021/8816; G01N 2021/8819; G01N 2021/8822; G01N 2021/8825; G01N 2021/8835; G01N 2021/8841; G01N 2021/8962; G01N 2021/8965; G01N 2021/8967; G01N 2021/9511;
(Continued)

(56) References Cited

U.S. PATENT DOCUMENTS

| 2,083,820 A | * | 6/1937 | Bissell ................... G02B 21/08 |
| | | | 359/891 |
| 4,585,315 A | * | 4/1986 | Sincerbox ............ G02B 21/125 |
| | | | 359/387 |

(Continued)

FOREIGN PATENT DOCUMENTS

| CN | 104279456 A | 1/2015 |
| CN | 2005846009 U | 12/2016 |

(Continued)

*Primary Examiner* — Gordon J Stock, Jr.

(57) ABSTRACT

The invention provides an apparatus for inspecting a light transmissible optical component. The apparatus comprises an image capturing module arranged on a first side of a support configured to hold a light transmissible optical component whilst it is being inspected. The apparatus includes an illumination device configured to shape light from a light source and to illuminate a selected portion of a surface of said light transmissible optical component with said shaped light to enable the image capturing module to capture any of a bright field image, a dark field image, or a combined bright field and dark field image of the light transmissible optical component being held by the support.

16 Claims, 13 Drawing Sheets

(58) Field of Classification Search
CPC ... G01N 2021/9583; G01N 2021/9586; G02B 21/10; G02B 21/12; G02B 21/125
USPC .................. 356/124, 237.1, 239.1–239.8
See application file for complete search history.

(56) References Cited

U.S. PATENT DOCUMENTS

| | | | | |
|---|---|---|---|---|
| 6,154,274 | A * | 11/2000 | Davis | G01M 11/0207 356/124 |
| 6,201,600 | B1 * | 3/2001 | Sites | G01M 11/0264 356/124 |
| 6,243,197 | B1 * | 6/2001 | Schalz | G02B 21/088 359/388 |
| 6,314,199 | B1 * | 11/2001 | Hofer | G01N 21/88 356/239.2 |
| 6,882,411 | B2 * | 4/2005 | Dispenza | G01M 11/0214 356/124 |
| 6,885,492 | B2 * | 4/2005 | DeSimone | G02B 21/06 359/290 |
| 7,330,579 | B2 * | 2/2008 | Edwards | G01M 11/02 382/141 |
| 8,242,477 | B2 * | 8/2012 | Lopatin | G01N 21/896 250/559.4 |
| 8,514,385 | B2 * | 8/2013 | Ben-Levy | G06T 7/0004 356/237.1 |
| 9,507,138 | B2 * | 11/2016 | Ohki | G02B 21/26 |
| 9,563,048 | B2 * | 2/2017 | Fukutake | G02B 21/12 |
| 9,678,324 | B2 * | 6/2017 | Yoshida | G02B 21/125 |
| 9,970,884 | B1 * | 5/2018 | Nikitin | G01N 21/958 |
| 10,302,575 | B2 * | 5/2019 | Smorgon | G01N 21/8806 |
| 2004/0100629 | A1 | 5/2004 | Stokowski et al. | |
| 2004/0223342 | A1 * | 11/2004 | Klipstein | G01J 3/10 362/555 |
| 2007/0211242 | A1 | 9/2007 | Okabe et al. | |
| 2015/0138540 | A1 * | 5/2015 | Newman | G01N 21/8803 356/124 |
| 2015/0185459 | A1 * | 7/2015 | Clark | G02B 21/086 359/385 |
| 2016/0123892 | A1 * | 5/2016 | Cauwenberghs | G01N 21/8806 356/237.2 |
| 2017/0082522 | A1 * | 3/2017 | Tan | G01N 21/958 |
| 2018/0299386 | A1 * | 10/2018 | Masumura | G01N 21/8806 |

FOREIGN PATENT DOCUMENTS

| | | | | |
|---|---|---|---|---|
| JP | 07190884 A | * | 7/1995 | ........ G01M 11/0278 |
| JP | 2007078581 A | * | 3/2007 | |
| JP | 2008249568 A | * | 10/2008 | |

* cited by examiner

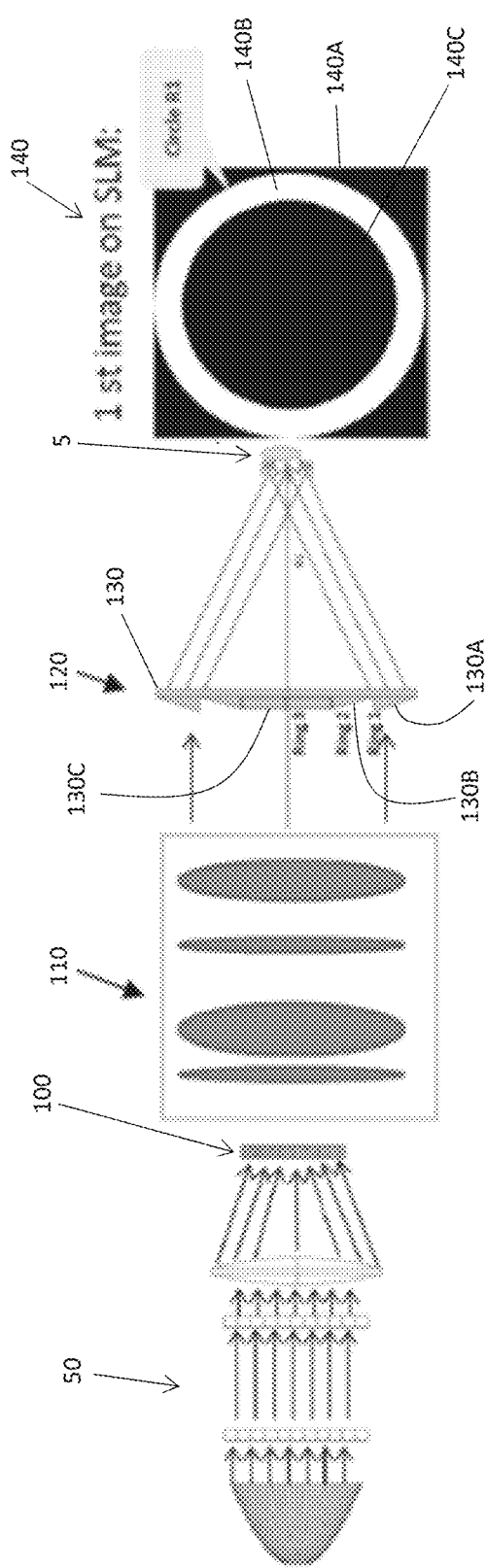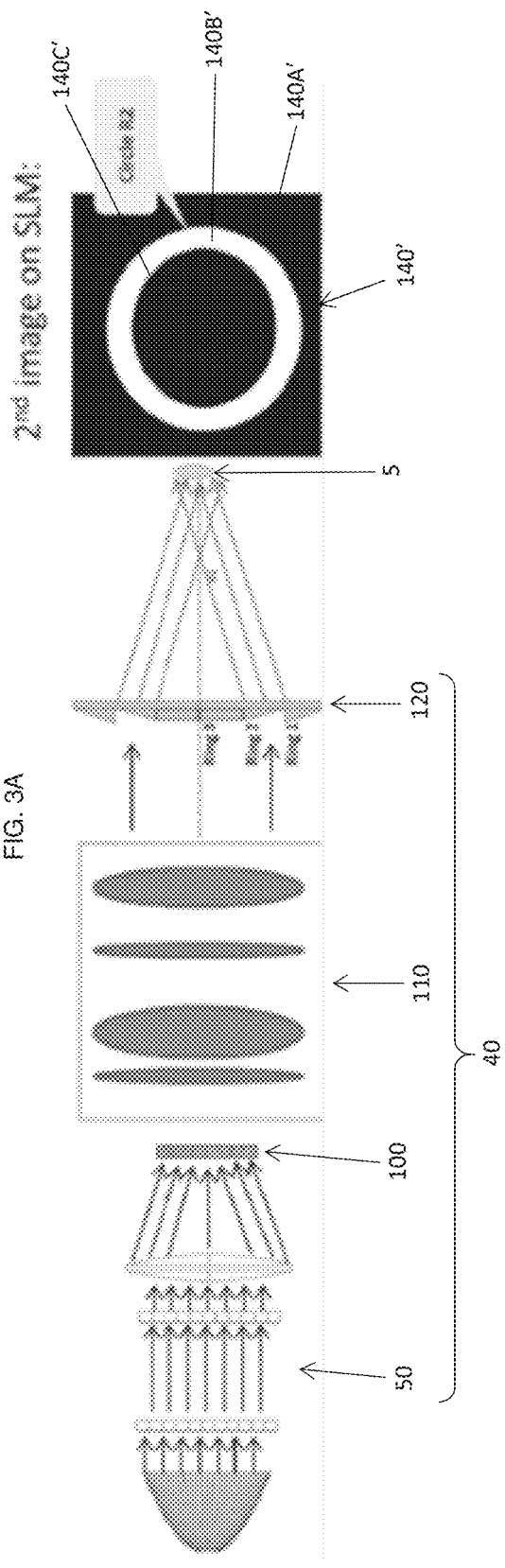

APPARATUS AND A METHOD FOR INSPECTING A LIGHT TRANSMISSIBLE OPTICAL COMPONENT

FIELD OF THE INVENTION

The invention relates to the field of inspecting light transmissible optical components and, particularly, but not exclusively, to an apparatus and a method for inspecting defects including anti-reflective coating defects in light transmissible optical components such as optical lenses.

BACKGROUND OF THE INVENTION

Optical instruments such as cameras and/or video cameras have been so commonly used in daily life that variations of them have been widely incorporated into portable electronic devices such as smart phones, tablet computers, as well as mobile surveillance units such as digital image and/or video recorders for home use or installed in vehicles or in buildings. Very often, these optical instruments or their variations comprise one or more light transmissible optical components such as optical lenses, and, during their manufacturing process, inspection of these optical lenses for defects has always been challenging. Lens inspection generally requires specialized skills of the human inspector, and the process can be highly time consuming and labor intensive. Existing methods of inspection may involve manual and visual checking for defects at the lens such as black spots, scratches, white dots, dust or dirt particles, air bubbles, digs, smudges, flow marks and/or other injection or coating defects, but not all of these defects are readily identifiable through visual checking alone. Quality of such inspections is thus largely dependent on the judgement and experience of the inspecting individual, which could be subjective and inconsistent. Accuracy of the inspections may further be compromised, especially during a mass production process, where a large number of lenses are to be manually and visually inspected quickly. It would be understandable that continuous and repetitive visual checking for long hours may cause vision fatigue or even damage to one's eyesight, which may further deteriorate quality and reliability of the inspection process.

US2004/0100629 discloses a method for altering the phase and/or amplitude of an optical beam within an inspection system using one or more spatial light modulator(s) (SLMs). The apparatus includes a beam generator for directing an incident optical beam onto a sample whereby at least a first portion of the incident optical beam is directed from the sample as an output beam and a detector positioned to receive at least a portion of the output beam. The sample being inspected comprises any of a reticle, photomask, printed circuit board or silicon wafer or device. A target image of the sample derived from the output beam is compared to a reference image to determine if any parts of the target image differ by more than a predetermined threshold amount from a corresponding part of the reference image to thereby identify defects. This method requires a reference image for comparison to identify defects in a target image, but the production of suitable reference images can lead to the identification of false defects in target images.

There is a need for an improved apparatus and method for inspecting light transmissible optical components such as optical lenses to identify defects in said optical components.

OBJECTS OF THE INVENTION

An object of the present invention is to provide an apparatus for inspecting a light transmissible optical component such as an optical lens.

Another object of the present invention is to provide an apparatus for automatically inspecting by machine a light transmissible optical component such as an optical lens.

Another object of the present invention is to mitigate or obviate to some degree one or more problems associated with known means for inspecting light transmissible optical components, or at least to provide a useful alternative.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides an apparatus for inspecting a light transmissible optical component. The apparatus comprises an image capturing module arranged on a first side of a support configured to hold a light transmissible optical component whilst it is being inspected. The apparatus includes an illumination device configured to shape light from a light source and to illuminate a selected portion of a surface of said light transmissible optical component with said shaped light to enable the image capturing module to capture any of a bright field image, a dark field image, or a combined bright field and dark field image of the light transmissible optical component being held by the support.

In a second main aspect, the invention provides a system for inspecting a light transmissible optical component comprising two or more apparatuses of the first main aspect arranged in a same orientation or different orientations relative to one another.

In a third main aspect, the invention provides an illumination device for an apparatus of the first main aspect or a system or the second main aspect, the illumination device comprising a spatial light modulator for receiving light from a light source, said spatial light modulator being configured to shape said received light for illuminating a selected portion of a surface of a light transmissible optical component, an optical projection system for projecting the shaped light towards the selected portion of the surface of said light transmissible optical component, and a light focusing system configured to focus the shaped light from the spatial light modulator onto the selected portion of the surface of said light transmissible optical component.

In a fourth main aspect, the invention provides a method of conducting an automated inspection of a light transmissible optical component using an apparatus of the first main aspect or a system or the second main aspect, the method comprising the steps of positioning a light transmissible optical component in said support, actuating the illumination device to illuminate a selected portion of a surface of said light transmissible optical component with said shaped light, capturing one or more images of the light transmissible optical component under illumination by the shaped light, and automatically analyzing the one or more images to identify a defect of the light transmissible optical component being inspected.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figure, of which:

FIG. 3A is a schematic diagram showing a first inspection stage using one of embodiments of an illumination device for the apparatus for inspecting a light transmissible optical component according to the present invention;

FIG. 3B is a schematic diagram showing a second inspection stage using the one of the embodiments of an illumination device of FIG. 3A;

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
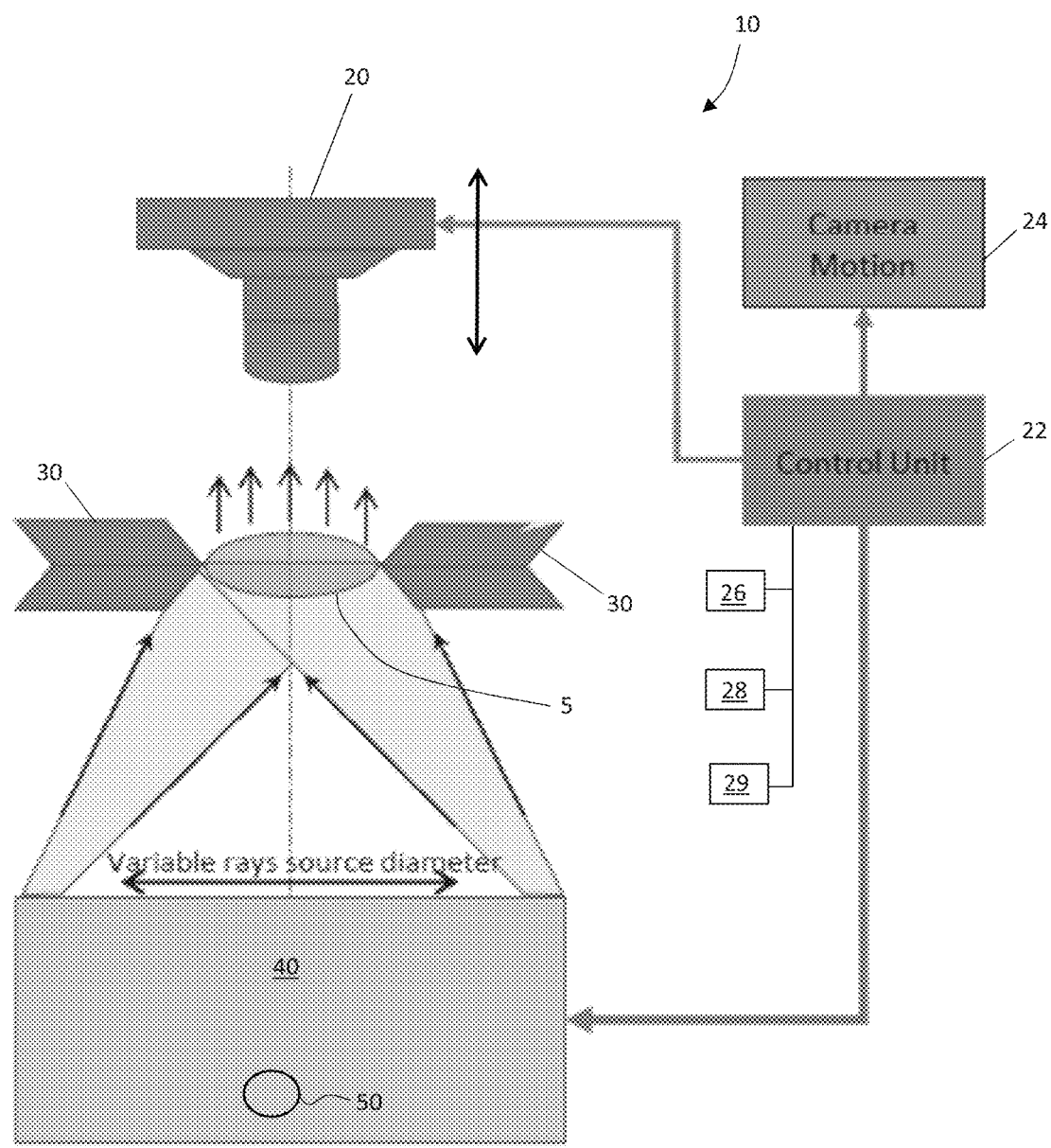
FIG. 1 is a schematic diagram showing a first embodiment of the apparatus for inspecting a light transmissible optical component according to the present invention.

Referring to FIG. 1, shown is a schematic diagram of a first embodiment of the apparatus 10 for inspecting a light transmissible optical component 5 according to the present invention. The optical component 5 can be any light transmissible object for various purposes such as, but not limited to, optical lenses for use in cameras, camera phones, video recorders, monoculars or binoculars, telescopes, or microscopes. The optical lenses may also be formed of any suitable materials which allow light transmission such as but not limited to crystals, glasses or plastics, etc. In the context of the present application, the term "light transmissible optical component" is not limited to transparent optical components, but includes, by way of example only, opaque optical components which do not transmit therethrough the whole of the light spectrum incident on a surface thereof. It also includes optical components having an anti-reflective surface or coating where the anti-reflective surface or coating is designed to reduce light reflection and thus increase efficiency of light transmission through the optical component. Consequently, a "light transmissible optical component" includes any optical component capable of transmitting therethrough some or all of the light incident on a surface thereof, i.e. an optical component which admits all or only a part of the light spectrum incident on one of its surfaces.

The apparatus 10 may comprise an observing position or means or, more specifically, an image capturing module 20 which can be one or more of a camera or a video camera adapted to capture one or more images or videos of the optical component 5 being inspected. Preferably, the image capturing module 20 is adapted to be connected with one or more of a controller or control unit 22, a camera motion controller 24, one or more computer storage mediums 26, an image processing means 28, and a network database 9 for outputting, transferring, storing and/or processing of any captured images and videos.

The control unit 22 may comprise a processor configured to execute machine code or the like stored in one or more of the computer storage mediums 26 to thereby implement the methods herein described. The one or more of the computer storage mediums 26 includes at least one non-transitory computer medium 26 for storing said machine code for implementing the methods herein described.

The image processing means 28 may comprise a separate processor to that comprising the control unit 22 or it may be provisioned by the control unit processor 22.

The camera motion controller 24 may also comprise a separate processor to that of the control unit processor 22, although it also may be provisioned by the control unit processor 22. The camera motion controller 24 is configured to control the positioning of the image capturing module 20, e.g. camera, or to control its focus with respect to the optical component 5 being inspected, but it will be understood that the camera motion controller 24 is not an essential part of the apparatus 10 and may not be present in other embodiments.

Although other embodiments hereinafter described show only a control unit 22, it will be understood that any of said embodiments may comprise any one or all of a camera motion controller 24, one or more computer storage mediums 26, an image processing means 28, and a network database 9 for outputting, transferring, storing and/or processing of any captured images and videos.

Referring again to FIG. 1, the image capturing module 20 can be arranged on a first side, such as an upper side as shown in FIG. 1, of a support 30 which is configured to hold the optical component 5 whilst it is being inspected. The apparatus 10 further comprises an illumination device 40, also referred to herein as an adaptive illumination device (AID), configured to shape light from a light source 50 and to illuminate a selected portion of a surface of said light transmissible optical component 5 with said shaped light. The light source 50 may comprise a LED device or a flash device. The selected portion of the surface of the light transmissible optical component 5 preferably comprises a whole of a light receiving surface of said light transmissible optical component 5 such as, for example, the whole of the bottom surface of the optical component 5 seen in FIG. 1.

Preferably, the illumination device 40 is further configured to focus said shaped light on said selected portion of the surface of said light transmissible optical component 5 to thereby concentrate the shaped light illuminating said selected portion of the surface of said light transmissible optical component 5. Concentration of the shaped light improves the quality of the bright field and/or dark field images of the optical component 5 under inspection. The illumination device 40 is also preferably configured to shape light from the light source 50 to provide a ring of light for illuminating a selected portion of the surface of said light transmissible optical component 5, but other shapes or patterns of light may be utilized for different formats or shapes of optical components being inspected. The illumination device 40 is preferably configured to direct light to the inspected object area of the optical component 5 with different angles.

In this embodiment, the shaped light illuminates a selected portion of a bottom surface of the light transmissible optical component 5. The shaped light passes through the optical component 5. The image capturing module 20 is positioned with respect to the optical component 5 to thereby enable the image capturing module 20 to capture any of a bright field image, a dark field image, or a combined bright field and dark field image of the light transmissible optical component 5 being held by the support 30. For that portion of the bottom surface of the transmissible optical component 5 which is illuminated by the shaped light such as a ring or annulus of light, an image captured by the image capturing module 20 may comprise any of a bright field image, a dark field image or a combined bright field image and dark field image dependent on the angle of incidence of said shaped light on the illuminated portion of the bottom surface. Preferably, the portion of the bottom surface comprises all of the light receiving part of the bottom surface of the optical component 5. It will be understood that, for this embodiment, a dark field image is obtained where shaped light incident on the bottom surface and transmitted through the optical component 5 does not reach the image capturing module 20 whereas a bright field image is obtained where shaped light incident on the bottom surface and transmitted through the optical component 5 does reach the image capturing module 20. The preferred image view is the whole of an upper surface of the transmissible optical component 5 held in the support 30, but, in some arrangements, the image view of the image capturing module 20 may be less than the whole of the upper surface of the transmissible optical component 5 and the size of the image view may be manually or automatically adjusted by operation of the camera motion controller 24.

As described above, this embodiment of the apparatus 10 illuminates a bottom surface of the transmissible optical component 5 under inspection and takes an image of light transmitted through said optical component 5.

Figure 2A:
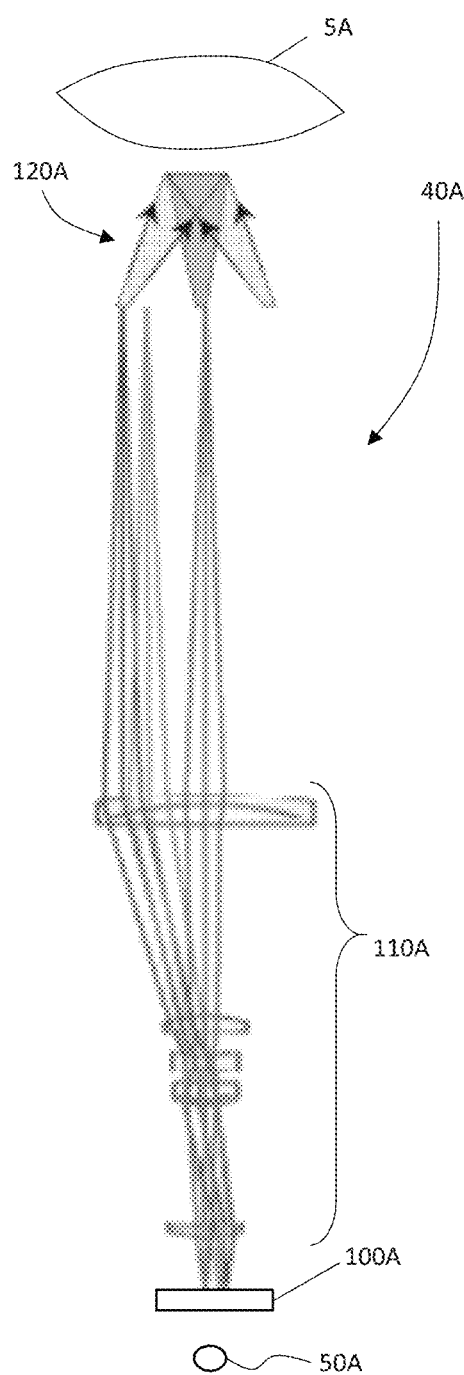
FIG. 2A is a schematic diagram showing a first embodiment of an illumination device for the apparatus for inspecting a light transmissible optical component according to the present invention.
Figure 2B:
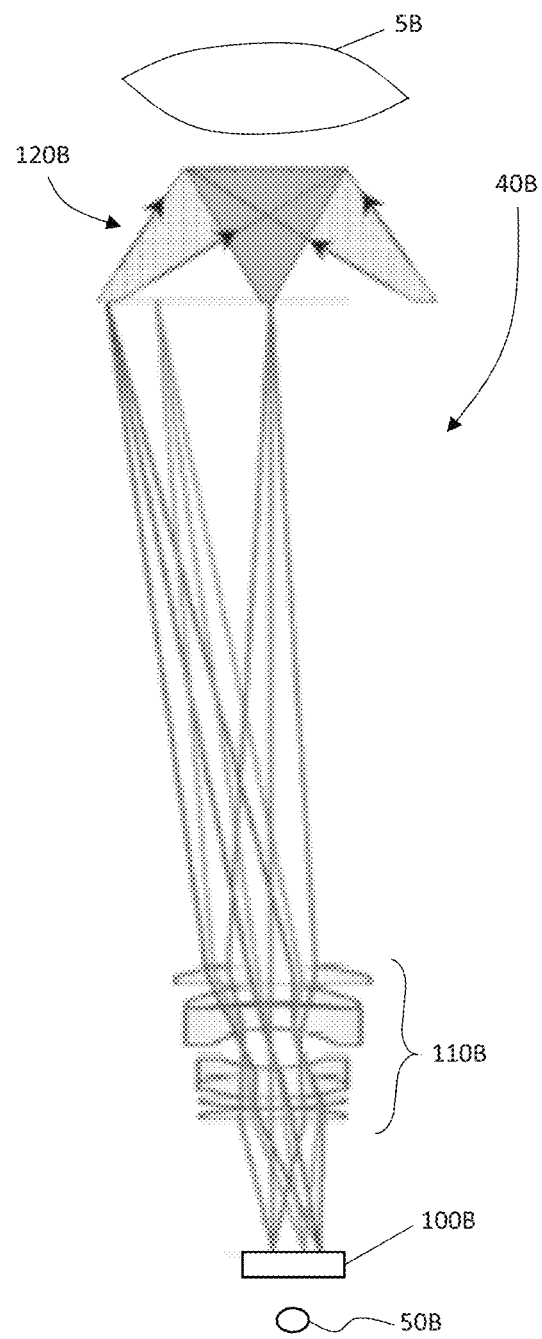
FIG. 2B is a schematic diagram showing a second embodiment of an illumination device for the apparatus for inspecting a light transmissible optical component according to the present invention.

Referring to FIGS. 2A and 2B, which show schematic diagrams of respective first and second embodiments of an illumination device 40A,B for any of the embodiments of the apparatus according to the present invention, it can be seen that the illumination device 40A,B may include a spatial light modulator (SLM) 100A,B for receiving light from a light source 50A,B. The SLM 100A,B may comprise any of a LCoS device, a DMD device, a LCD device, or any other suitable light modulating/imaging device. LCos and DMD or any other light modulating/imaging device could be grayscale or coloured. The SLM 100A,B may comprise a coloured DMD device with three red, green, blue (RGB) LEDs or any white light source with a colour wheel.

The light source 50A,B may form part of the illumination device 40A,B or may comprise a stand-alone light source 50A,B. The SLM 100A,B is configured to shape light from the light source 50A,B for illuminating one or more selected portions of a surface of said light transmissible optical component 5A,B. The SLM is preferably configured to impose spatially varying modulation on a beam of light to thereby manipulate the beam of light into a desired shape or shapes for one or more inspection modes or stages.

The SLM 100A,B may comprise a programmable SLM. The control unit 22 may be operable to configure the SLM 100A,B to automatically adjust a phase and/or amplitude profile of the received light. For example, the SLM 100A,B may be configured to alter the illumination profile of the received light to achieve different inspection modes.

For each of FIGS. 2A and 2B, the illumination device 40A,B preferably includes an optical projection system 110A,B configured to project the shaped light from the SLM 100A,B towards a selected portion of the surface of said light transmissible optical component 5A,B. The optical projection system 110A,B may comprise an objective lens assembly or device. In the case of FIG. 2A, the optical projection system 110A comprises a telecentric lens system, whereas, in the case of FIG. 2B, the optical projection system 110B comprises a conventional lens system, but it will be understood that other arrangements of lens systems or light projection systems may be utilised.

The illumination device 40A,B is preferably configured to shape light from the light source 50A,B to provide a ring of light for illuminating a selected portion, but preferably the whole of the light receiving part, of the surface of said light transmissible optical component 5A,B and to successively vary a diameter of said ring of light to successively illuminate said selected portion of the surface of said light transmissible optical component 5A,B at different incident angles. One method of varying a diameter of said ring of light is to vary or adjust a focal length of the optical projection system 110A,B.

Preferably, the illumination device 40A,B includes a light focusing system 120A,B configured to focus the shaped light from the SLM 100A,B to thereby concentrate said shaped light onto a selected portion of the surface of said light transmissible optical component 5A,B. The light focusing system 120A,B may comprise any one of a holographic optical element (HOE), a diffractive optical element (DOE), a truncated cone optical element, a simple ring axicon, a compound axicon, a lens array plus lens shaper designed to direct light to the inspected area of the object 5 or any other optical system designed to provide illumination of a designated or selected area of an object such as the optical component 5.

Referring now to FIGS. 3A and B, shown are schematic diagrams of respectively a first inspection stage using an embodiment of the afore-described illumination device 40 for the apparatus 10 according to the present invention and a second inspection stage using said embodiment of the illumination device 40.

FIG. 3A shows a first inspection stage and FIG. 3B shows a second inspection stage whereby the SLM 100 shapes light received from the light source 50 into a ring or annulus of light which is projected by the telecentric optical projection system 110 towards the transmissible optical component 5 being inspected. In this instance, the light focusing system 120 comprises a light transmissible element in the form of a light transmissible truncated cone set 130 comprising an outer ring 130A ("Ring 1"), an inner ring 130B ("Ring 2") and a central ring 130C ("Ring 3"). The outer and inner rings 130A,B each comprise an annular truncated cone with the outer ring 130A having a larger diameter than the inner ring 130B. The central ring 130C comprises a cylindrical central section of the truncated cone set 130 of smaller diameter than the inner ring 130B. The outer ring 130A, the inner ring 130B and the central ring 130C are provided on the light receiving side of the truncated cone set 130. The truncated cone set 130 preferably comprises a compound axicon which preferably produces a same thickness of light ring from each of the outer ring 130A and the inner ring 130B.

In the case of FIG. 3A, it can be seen that the ring of light from the SLM 100 projected by the optical projection system 110 towards the transmissible optical component 5 reaches only the outer ring 130A of the truncated cone set 130 and consequently presents an image 140 denoted as "Circle R1" comprising an annular bright image portion 140B surrounded by outer and central dark image portions 140A,C.

In the case of FIG. 3B, the ring of light from the SLM 100 projected by the optical projection system 110 towards the transmissible optical component 5 reaches only the inner ring 130B of the truncated cone set 130 and consequently presents an image 140' denoted as "Circle R2" comprising an annular bright image portion 140B' surrounded by outer and central dark image portions 140A',C'. The annular bright image portion 140B' of FIG. 3B has a smaller diameter than the bright image portion 140B of FIG. 3A. Thus, the illumination angle of light on the inspected object 5 is different for the two inspection stages of FIGS. 3A and 3B being equal to $\theta_1$ and $\theta_2$ respectively.

In a not shown next inspection stage, i.e. a third inspection stage, the light from the SLM 100 is projected onto only the central ring 130C of the truncated cone set 130 and consequently presents an image (not shown) comprising a central bright image portion comprising a circle surrounded by a dark image portion filling the remainder of the image view. The circle of the central bright image portion has a smaller diameter than the bright image portion 140B' of FIG. 3B.

Whilst the truncated cone set 130 as seen in FIGS. 3A,B provides for three stages of inspection, it will be understood that the number of stages of inspection could be varied by providing less or more truncated cone rings of different diameters in the truncated cone set 130 and by controlling the projection system 110 to direct the shaped light from the SLM 100 onto a selected one of the truncated cone set rings or central portion in order to illuminate a surface of the transmissible optical component 5 under inspection.

The illumination device 40 may be automatically controlled by the control unit 22 to successively vary a dimension of the shaped light to successively the selected portion of the surface of the light transmissible optical component 5 under inspection to enable the image capturing module 20 to successively capture any of a bright field image, a dark field image, or a combined bright field and dark field image of the light transmissible optical component 5 being held by the support 30 for each of the successive variations of the dimension of the shaped light. This may include controlling the illumination device 40 to successively vary the diameter of the ring of light from the SLM 100 to provide respective concentric rings of light to illuminate the surface of said light transmissible optical component 5 at different respective incident angles.

Figure 4:
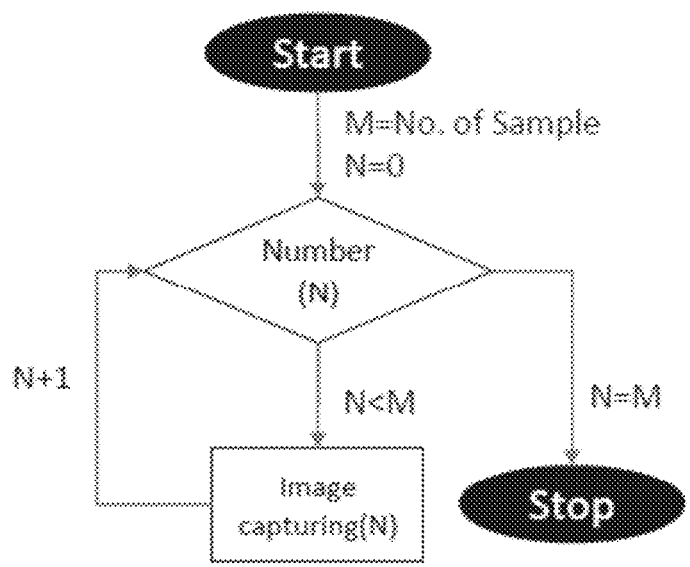
FIG. 4 is a flow chart of the image capturing process using the apparatus for inspecting a light transmissible optical component according to the present invention.

FIG. 4 provides a flow chart of an automatic image capturing process using the apparatus 10 of FIG. 1 controlled by the control unit 22. M equals the number of samples or inspection stages and N has an initial value of "0" and is incremented after each sample or inspection stage. The process stops when N=M.

Figure 5:
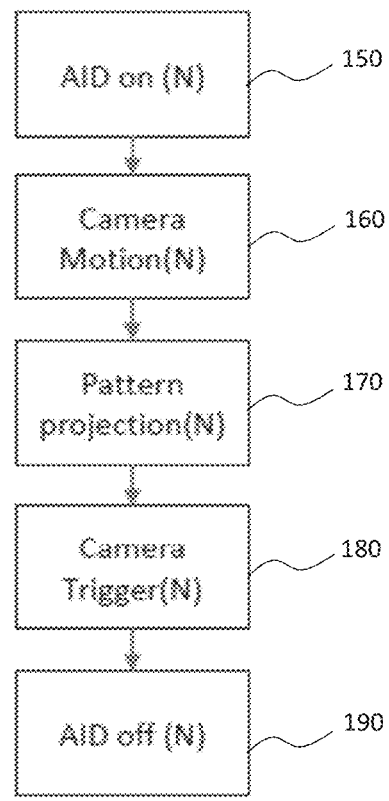
FIG. 5 is a flow chart of a first operation scheme for the illumination device when using the image capturing process of FIG. 4.

FIG. 5 is a flow chart of a first operation scheme for the illumination device when using the image capturing process of FIG. 4 and the apparatus of FIG. 1. For each sample or inspection stage N, the illumination device 40 or adaptive illumination device (AID) is actuated in a first step 150. Where the embodiment of the apparatus 10 includes a camera motion controller 24, the position of the image capturing module 20 is adjusted in an optional step 160. Subsequently, the AID is controlled to provide a shaped light (pattern projection) corresponding to the inspection stage N in a step 170. The image capturing module 20 is then triggered in step 180 to capture an image of the transmissible optical component 5 under inspection and finally, in step 190, the AID is switched off. This process is repeated for each inspection stage.

Figure 6:
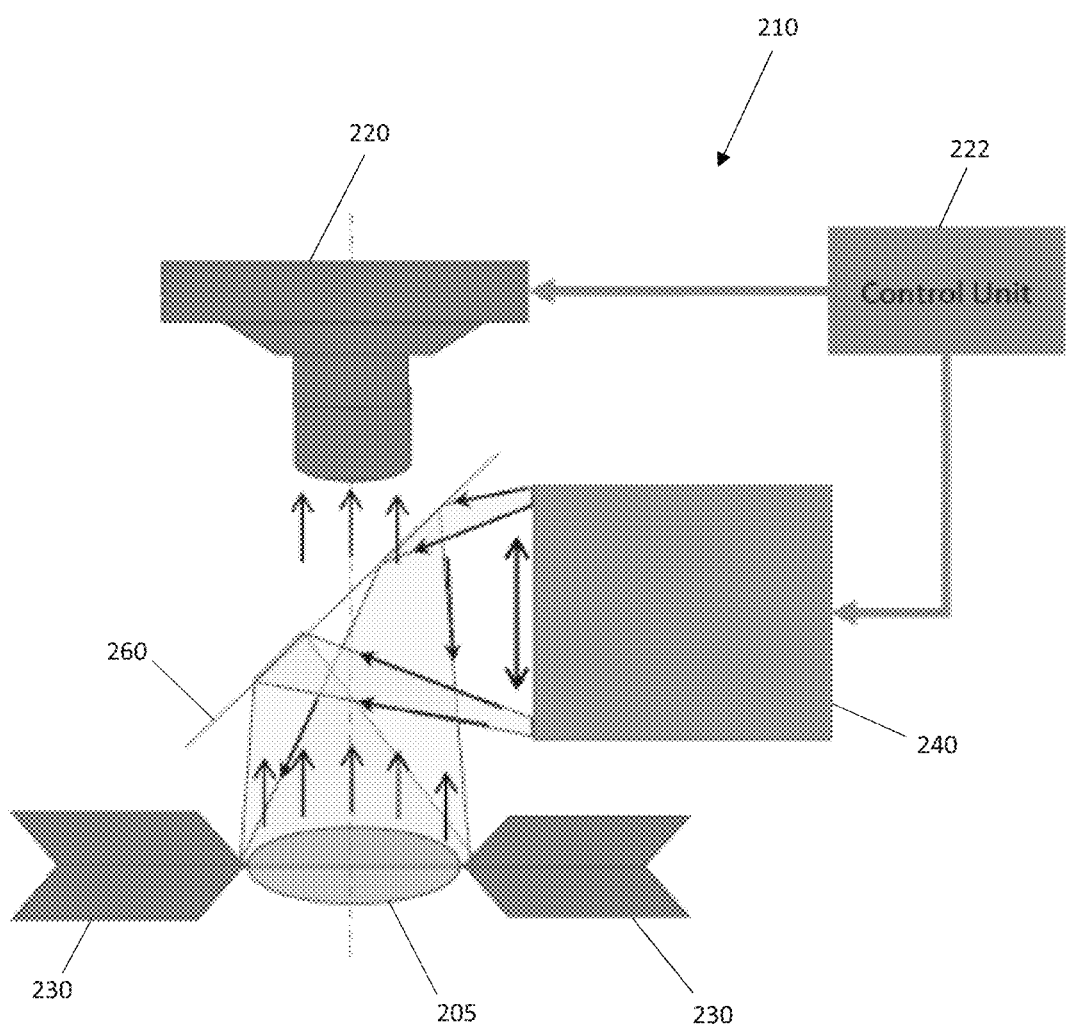
FIG. 6 is a schematic diagram showing a second embodiment of the apparatus for inspecting a light transmissible optical component according to the present invention.

FIG. 6 is a schematic diagram showing a second embodiment of the apparatus for inspecting a light transmissible optical component according to the present invention. Like numerals to depict like parts shown in FIG. 1 are denoted by the same numerals, but preceded by a "2".

The apparatus 210 differs from the apparatus of FIG. 1 in that the illumination device 240 is positioned on a same first side of the light transmissible optical component 205 held by the support 230 as that of the image capturing module 220. As in other embodiments, the apparatus 210 may be automatically controlled by the control unit 222. A further difference is the provision of an optical element or beam splitter 260 positioned between the image capturing module 220 and the support 230. The optical element or beam splitter 260 is arranged to redirect shaped light from the illumination device 240 towards the light transmissible optical component 205 under inspection and to allow shaped light reflected by a surface of the light transmissible optical component 205 to pass therethrough to be received at the image capturing module 220. The optical element or beam splitter 260 may comprise a semi-transparent mirror or any other suitable optical element or device which is adapted to redirect shaped light from the illumination device 240 towards the light transmissible optical component 205 under inspection and to allow shaped light reflected by a surface of the light transmissible optical component 205 to pass therethrough to be received at the image capturing module 220. The reflective surface of the semi-transparent mirror may be placed at any suitable angle to the direction of a light path for light reflected by a surface of the optical component 205 towards the image capturing module 220, but is preferably mounted at a 45 degree angle to said light path, i.e. at 45 degrees to an optical axis of an objective lens of the image capturing module 220.

This embodiment of the apparatus 210 also differs from that of FIG. 1 in that it illuminates an upper surface of the light transmissible optical component 205 under inspection and takes an image of light reflected off said upper surface.

The automatic image capturing processes according to the flow charts of FIGS. 4 and 5 can be utilized with the apparatus 210 of FIG. 6.

Figure 7:
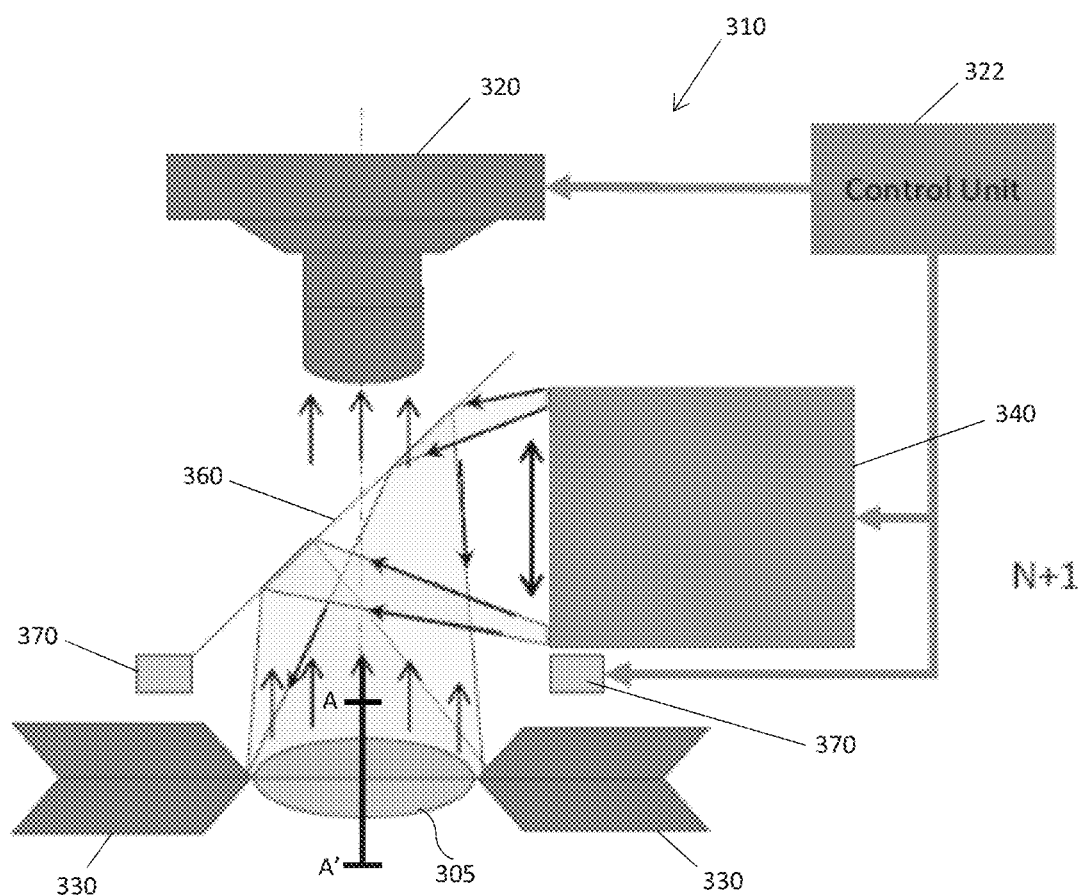
FIG. 7 is a schematic diagram showing a third embodiment of the apparatus for inspecting a light transmissible optical component according to the present invention.

FIG. 7 is a schematic diagram showing a third embodiment of the apparatus for inspecting a light transmissible optical component according to the present invention. Like numerals to depict like parts shown in FIG. 1 are denoted by the same numerals, but preceded by a "3".

The apparatus 310 is generally the same as the apparatus of FIG. 6 save for the inclusion in the apparatus 310 of one or more additional illuminators 370 preferably positioned adjacent to the support 330 on a same side as the image capturing module 330, although in some arrangements, the additional illuminators 370 may be positioned on an opposite (lower) side of the support 330 or on both sides of the support 330.

The illumination device 340 and the one or more additional illuminators 370 may be configured to be selectively switched on to enable the image capturing module 320 to capture one or more bright field images and/or dark field images of the optical component 305 being inspected for various configurations of illumination from the illumination device 340 and the one or more additional illuminators 370.

The one or more additional illuminators 370 may each comprise an annular configuration, such as in the form of a disc-shaped illuminator arranged at the side of the support 330. The disc-shaped configuration may comprise a free space central hole substantially aligned with an axis A-A' passing centrally through the support 330, with the axis A-A' preferably aligned also with a light path towards the image capturing module 320, as shown in FIG. 7. This allows any image capturing of the optical component 305 by the image capturing module 320 to be free from being blocked or interfered with by the one or more of the additional illuminators 370.

This embodiment of the apparatus 310 also illuminates an upper surface of the light transmissible optical component 305 under inspection and takes an image of light reflected off said upper surface.

The apparatus 310 of FIG. 7 is well adapted for detecting anti-reflective coating defects in optical components, because it enables light reflected from the inspected optical component to be inspected and/or processed to identify such a defect. Detection of reflected light from inspected element 305 allows inspection of anti-reflective (AR) coatings with higher sensitivity than transmitted light, because for inspection by transmitted light it is necessary to detect the range of some percentages of the total light intensity, but reflected light detection allows detection of these some percentages totally by appropriate alignment of exposure. Reflected light from an area with a normal AR coating has low light intensity. But if there is a defective or uncoated area then reflected light has a higher than expected intensity. Also some kinds of surface defects such as scratches, exfoliations, etc. are more visible when using reflected light.

Figure 8:
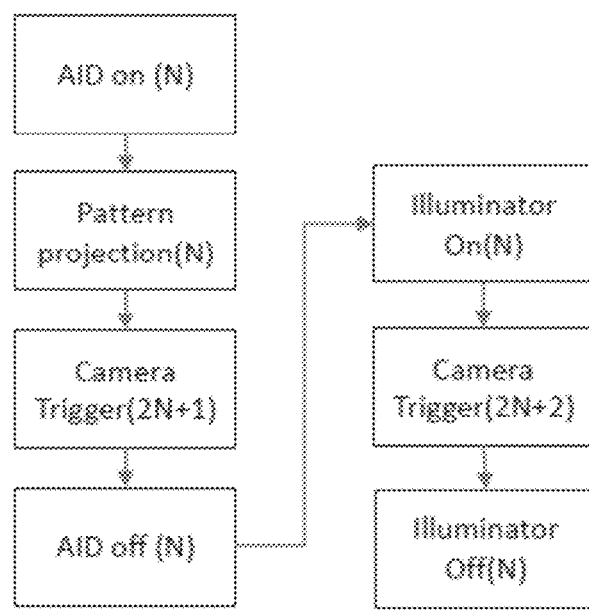
FIG. 8 is a flow chart of a second operation scheme for the illumination device when using the image capturing process of FIG. 4.

The automatic image capturing process according to the flow chart of FIG. 4 is applicable to the apparatus 310 of FIG. 7, but the flow chart of FIG. 5 is adapted to provide the flow chart of FIG. 8 to account for the selective actuation of the one or more additional illuminators 370.

Figure 9:
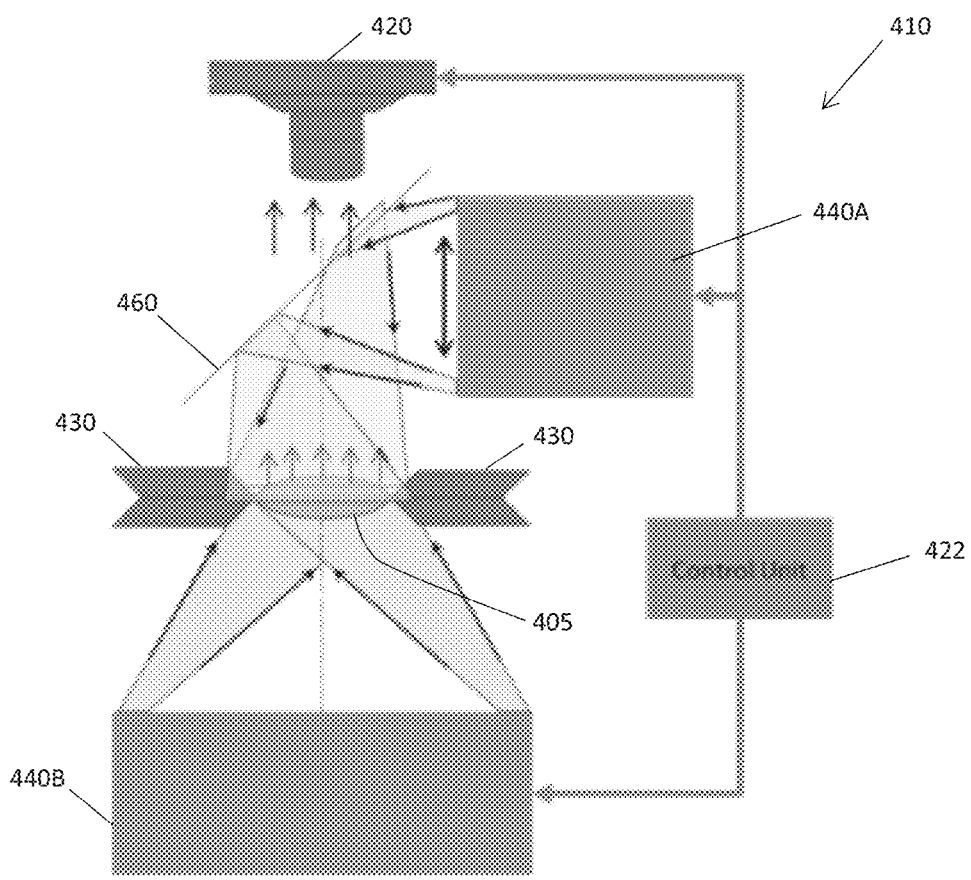
FIG. 9 is a schematic diagram showing a fourth embodiment of the apparatus for inspecting a light transmissible optical component according to the present invention.

FIG. 9 is a schematic diagram showing a fourth embodiment of the apparatus for inspecting a light transmissible optical component according to the present invention. Like numerals to depict like parts shown in FIG. 1 are denoted by the same numerals, but preceded by a "4".

It can be seen that the apparatus 410 of FIG. 9 comprises a combination of the apparatuses of FIGS. 1 and 6, although it could also comprise a combination of the apparatuses of FIGS. 1 and 7 allowing for the inclusion of additional illuminators as in the apparatus of FIG. 7. As such, the apparatus 410 comprises two illumination devices 410A,B (AIDs) which may be identically configured or have different configurations with respect to the shaping of light or light patterns they may produce.

A first 440A one of the illumination devices is positioned on a same side of the support 430 as the image capturing module 420 and is arranged to illuminate an upper surface of the optical component 405 under inspection. The optical element or beam splitter 460 is arranged to redirect shaped light from the first illumination device 440A towards the optical component 405 under inspection and to allow shaped light reflected by a surface of the optical component 405 to pass therethrough to be received at the image capturing module 420.

A second 440B one of the illumination devices is positioned on an opposite side of the support 430 to that of the image capturing module 420 and is configured to illuminate a bottom surface of the optical component 405. As such, the image capturing module 420 is positioned to take images of light projected by the second illumination device 440B onto the bottom surface of the optical component 405 where said light passes through the body of the optical component 405 to reach the image capturing module 420.

The apparatus 410 of FIG. 9 is also well adapted for detecting anti-reflective coating defects in optical components for similar reasons as for FIG. 7.

Figure 10:
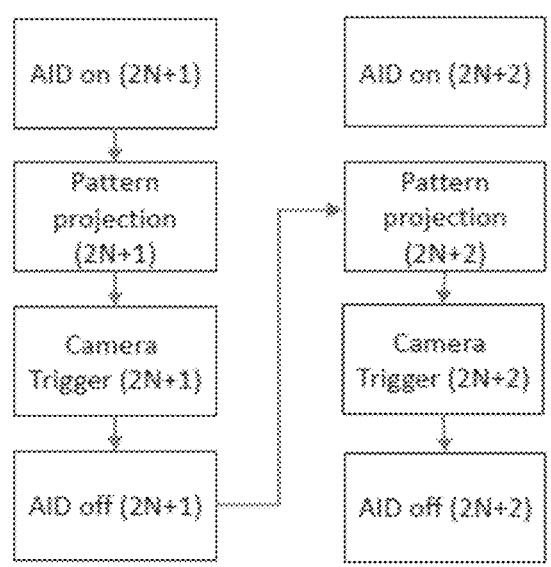
FIG. 10 is a flow chart of a third operation scheme for the illumination device when using the image capturing process of FIG. 4.

The automatic image capturing process according to the flow chart of FIG. 4 is applicable to the apparatus 410 of FIG. 9, but the flow chart of FIG. 5 is adapted to provide the flow chart of FIG. 10 to account for the selective actuation of the first and second illumination devices 440A,B.

Figure 11:
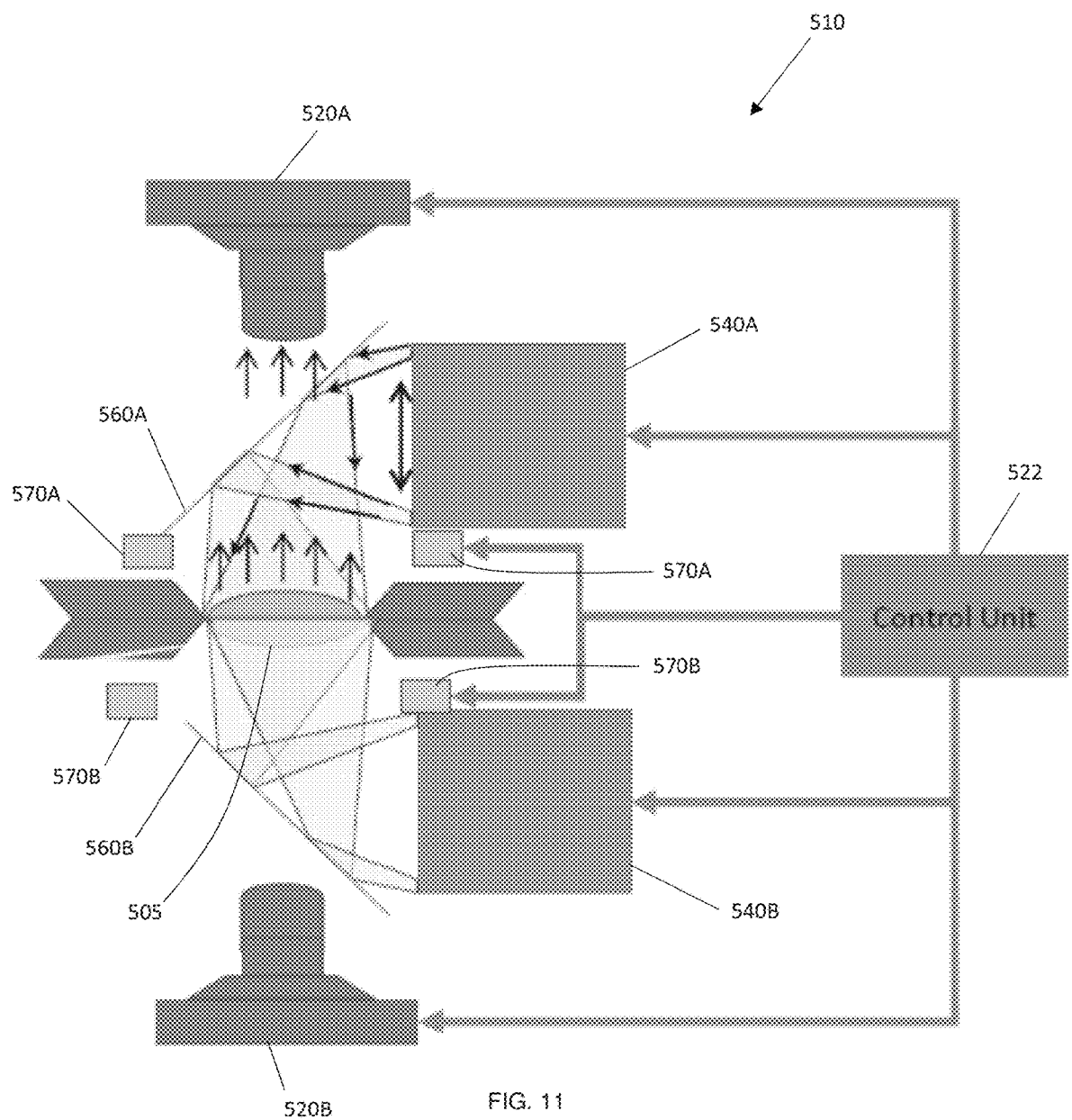
FIG. 11 is a schematic diagram showing a fifth embodiment of the apparatus for inspecting a light transmissible optical component according to the present invention.

FIG. 11 is a schematic diagram showing a fifth embodiment of the apparatus for inspecting a light transmissible optical component according to the present invention. Like numerals to depict like parts shown in FIG. 1 are denoted by the same numerals, but preceded by a "5".

It can be seen that the apparatus 510 of FIG. 11 generally comprises a pair of the apparatuses of FIG. 7, although it could also comprise a pair of the apparatuses of FIG. 6. As such, the apparatus 510 comprises first and second image capturing modules 520A,B arranged on opposing sides of the single optical component support 530. The first and second image capturing modules 520A,B may comprise different types of image capturing devices, but are preferably identical devices. Also provided are first and second illumination devices 540A,B and, whilst the first and second illumination devices 540A,B may be configured to produce different shaped light or light patterns relative to one another, they are preferably configured to provide identical forms of illumination for the optical component 505 under inspection. Associated with the first and second illumination devices 540A,B are respective first and second optical elements or beam splitters 560A,B.

The first optical element or beam splitter 560A is arranged to redirect shaped light from the first illumination device 540A towards the optical component 505 under inspection and to allow some of the shaped light reflected by an upper surface of the optical component 505 to pass therethrough to be received at the first image capturing module 520A. However, in this embodiment, some of the shaped light from the first illumination device 540A directed towards the upper surface of the optical component 505 by the first optical element or beam splitter 560A may pass through the body of the optical component 505 and travel towards the second image capturing module 520B which may also take one or more images of the optical component using light from the first illumination device 540A.

In a same manner, the second optical element or beam splitter 560B is arranged to redirect shaped light from the second illumination device 540B towards the optical component 505 under inspection and to allow some of the shaped light reflected by a bottom surface of the optical component 505 to pass therethrough to be received at the second image capturing module 520B. Also, some of the shaped light from the second illumination device 540B directed towards the bottom surface of the optical component 505 by the second optical element or beam splitter 560B may pass through the body of the optical component 505 and travel upwardly towards the first image capturing module 520A which may also take one or more images of the optical component using light from the second illumination device 540B.

It can be seen therefore that the combination of apparatuses provided by the apparatus 510 of the embodiment of FIG. 11 increases the permutations of image capturing modes by the first and second image capturing modules 520A,B using light selectively from the first and second illumination devices 540A,B.

The permutations of image capturing modes is further increased by the presence of the first and second additional illuminators 570A,B provided on opposing sides of the support 530. As in other embodiments where additional illuminators are provided, the first and second additional illuminators 570A,B of this embodiment can be selectively actuated to increase the number of image capturing modes. Furthermore, the intensities and other characteristics of illumination of both the additional illuminators 570A,B and the illumination devices 540A,B may be adjusted to further increase the number of image capturing modes.

In the apparatus 510 of FIG. 11, preferably only a single control unit 522 is provided for automatically controlling the operation of various devices comprising the apparatus 510.

The apparatus 510 of FIG. 11 is well adapted for detecting anti-reflective coating defects in optical components, because it enables light reflected from both the top and bottom surfaces of the inspected optical component to be inspected and/or processed to identify a defect.

Figure 12:
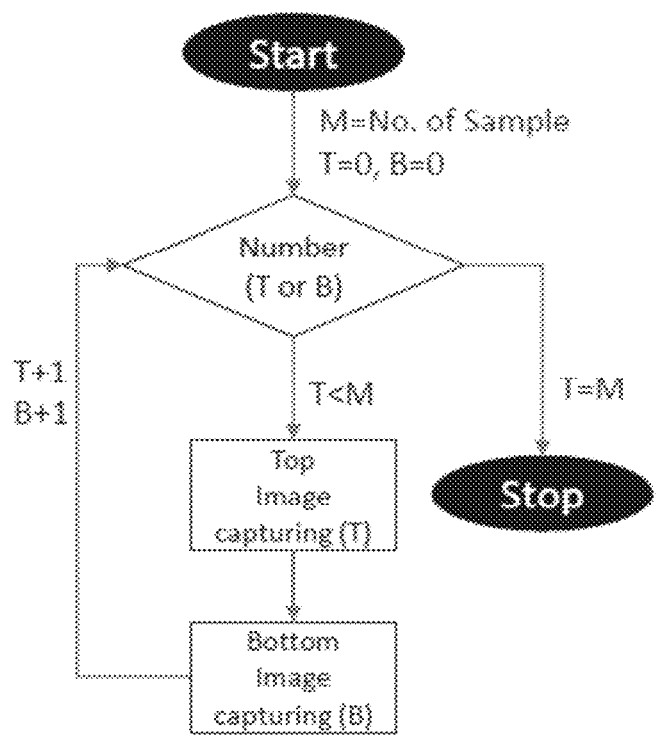
FIG. 12 is a flow chart of the image capturing process using the apparatus for inspecting a light transmissible optical component of FIG. 11.
Figure 13:
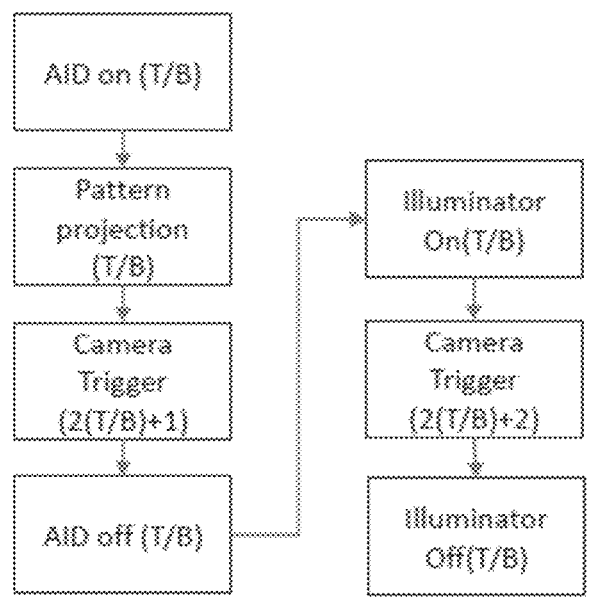
FIG. 13 is a flow chart of a first operation scheme for the illumination device when using the image capturing process of FIG. 12.

The automatic image capturing process according to the flow chart of FIG. 4 is adapted to provide the flow chart of FIG. 12 to account for at least the modes of capturing images from both the top and the bottom of the support 530, although the apparatus 510 of this embodiment enables a significant increase in the number of image capturing modes and thus the flow chart of FIG. 12 represents only some, but not all of such image capturing modes. Likewise, the operation flow chart of FIG. 13 represents a preferred mode of actuating the first and second illumination devices 540A,B and the first and second additional illuminators 570A,B, but it does not represent all modes of selectively actuating the first and second illumination devices 540A,B and the first and second additional illuminators 570A,B.

Figure 14:
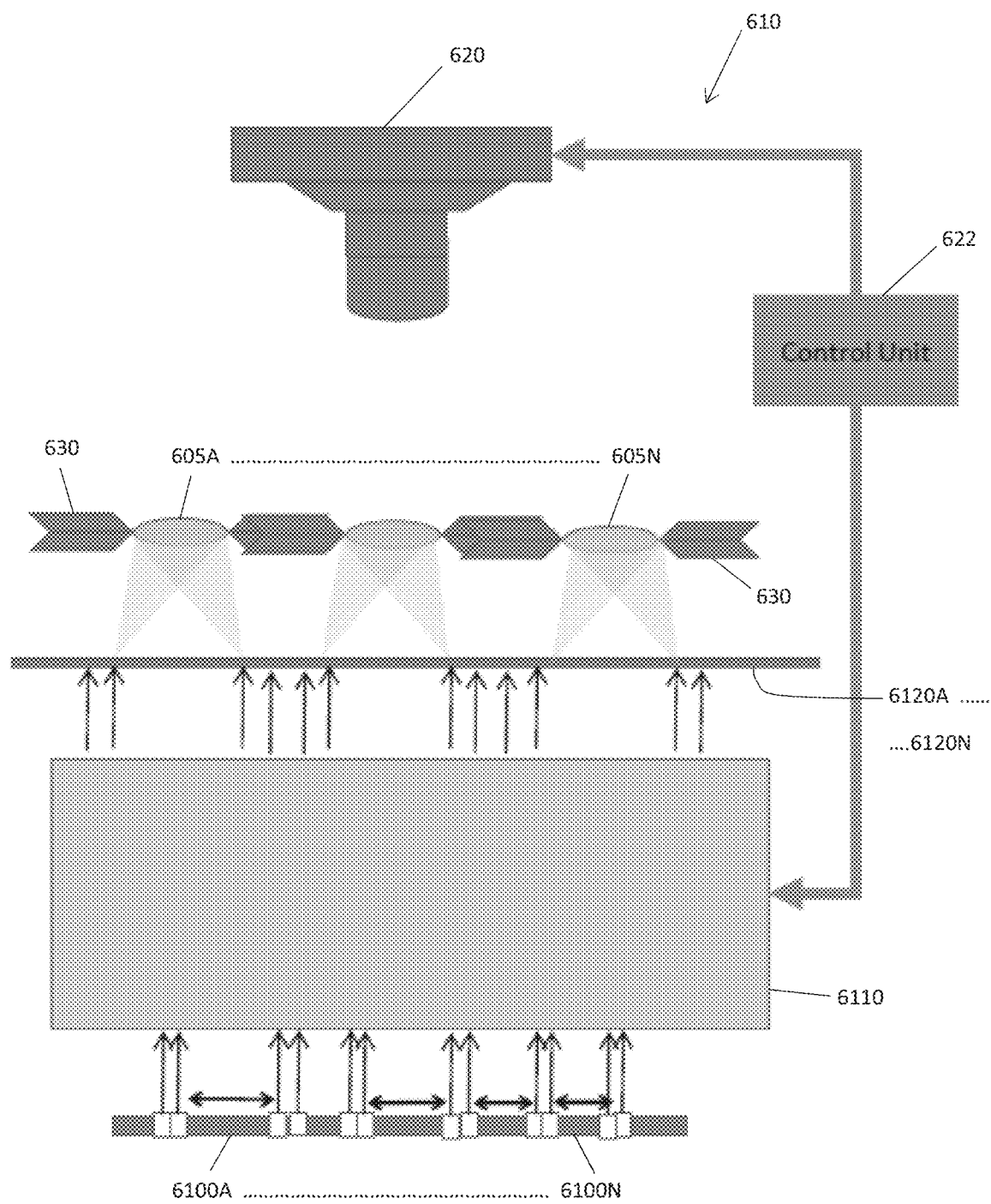
FIG. 14 is a schematic diagram showing a sixth embodiment of the apparatus for inspecting a light transmissible optical component according to the present invention.

FIG. 14 is a schematic diagram showing a sixth embodiment of the apparatus for inspecting light transmissible optical components according to the present invention. Like numerals to depict like parts shown in FIGS. 1 and 2 are denoted by the same numerals, but preceded by a "6".

The embodiment of the apparatus 610 of FIG. 14 is adapted for mass automatic machine inspection of a plurality of optical components 605A . . . 605N simultaneously or serially in a production line mode. The apparatus comprises one or a plurality of image capturing modules 620 configured to take one or more images of a plurality of optical components 605A . . . 605N under inspection when said optical components 605A . . . 605N are illuminated by shaped light or like patterns from respective ones of a plurality of SLMs 6100A . . . 6100N. The support 630 is adapted to hold a plurality of light transmissible optical components 605A . . . 605N. One or a plurality of light projection systems 6110 may be provided for directing light from the SLMs 6100A . . . 6100N to their respective optical components 605A . . . 605N under inspection. One or a plurality of light focusing systems 6120A . . . 6120N may be provided for focusing light from the SLMs 6100A . . . 6100N onto their respective optical components 605A . . . 605N. Preferably, the light focusing system 6120 comprise a single device formed as a matrix of light focusing elements such as a matrix or array of light transmissible truncated cone sets. The matrix or array preferably comprises a microlens array of a type taught by the publication entitled "Computer Design of Diffractive Optics", Ed. by Soifer Cambridge International Science Publishing, 2013 having a phase function which is the sum of the lens and lenslet array (paraxial) according to the equation:

$$\Phi(x, y) = -\frac{k(x^2 + y^2)}{2F_L} - \frac{k}{2F_{LA}} \sum_{m,n}^{M,N} (x - mx_{LA})^2 + (y - ny_{LA})^2$$

where k is incident light wavenumber ($2\pi/\lambda$, $\lambda$ is wavelength), FL is focal length of a main lens, FLA is focal length of lenses in the array, M and N are the number of lenses in the array for X and Y coordinates, xLA and yLA comprise the size of a single lens in the array.

The matrix or array may comprise singled, round, hexagonal, rectangle or square lens matrix (fly eye) or cross-positioned cylindrical lens arrays and positive lens (refractive or Fresnel).

The lens array as described for FIG. 14 could be adapted for use in any of the embodiments of the present application.

Each of the plurality of SLMs 6100A . . . 6100N may be controlled to provide shaped lights or patterns of lights sequentially for a series of inspection stages for its respective optical component. Alternatively, each of the plurality of SLMs 6100A . . . 6100N may be controlled to provide a single shaped light or pattern of light for a specific inspection stage and the optical components controlled to move sequentially from a first SLM 6100A to a next SLM 6100B, etc. for each of a series of inspection stages.

Figure 15:
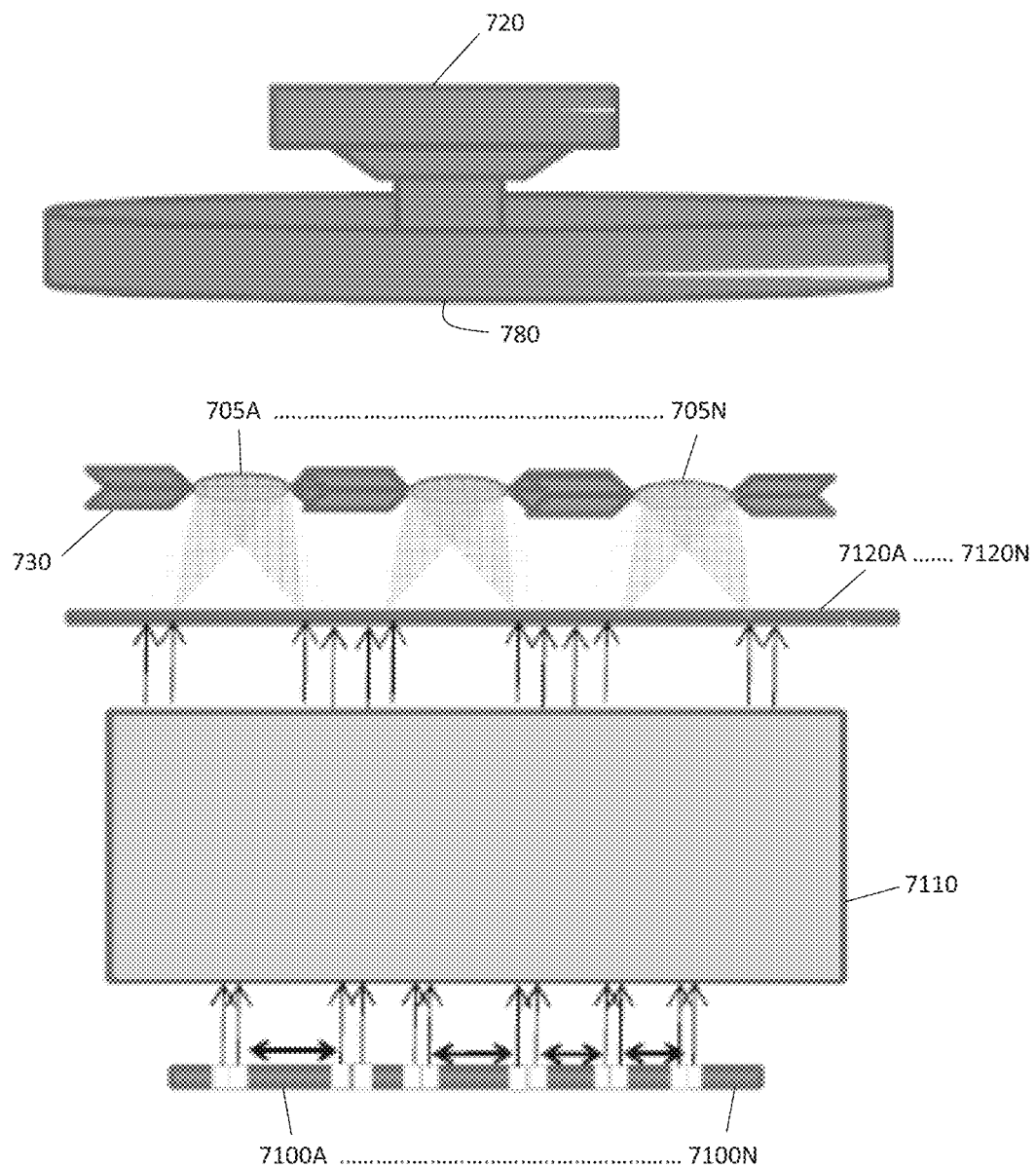
FIG. 15 is a schematic diagram showing a seventh embodiment of the apparatus for inspecting a light transmissible optical component according to the present invention.

FIG. 15 is a schematic diagram showing a seventh embodiment of the apparatus for inspecting a light transmissible optical component according to the present invention. Like numerals to depict like parts shown in FIGS. 1 and 2 are denoted by the same numerals, but preceded by a "7".

This embodiment is generally the same as that for FIG. 14 save for the inclusion of a lens device 780 or the like for the image capturing module 720. The lens device 780 enables the image capturing module 720 to simultaneously take images of all optical components 705A . . . 705N under inspection for automatic machine analysis.

Figure 16:
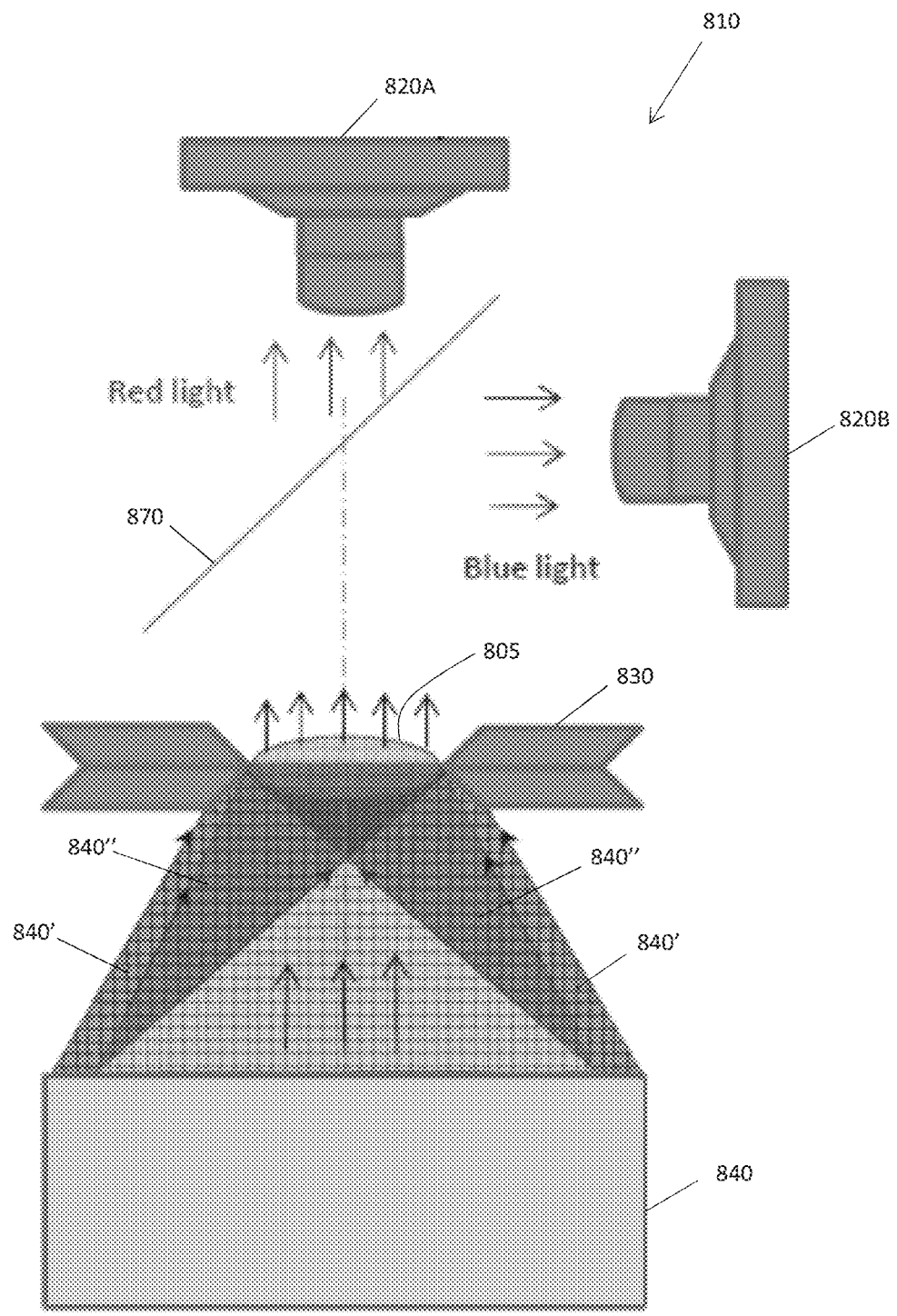
FIG. 16 is a schematic diagram showing an eighth embodiment of the apparatus for inspecting a light transmissible optical component according to the present invention.

FIG. 16 is a schematic diagram showing an eighth embodiment of the apparatus for inspecting a light transmissible optical component according to the present invention. Like numerals to depict like parts shown in FIG. 1 are denoted by the same numerals, but preceded by a "8".

Figure 18:
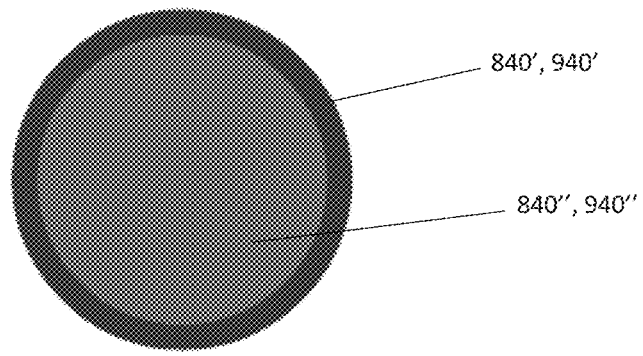
FIG. 18 shows different colours of light shaped to illuminate respective selected portions of a surface of a light transmissible optical component under inspection.

In this embodiment, the illumination device 840 is configured to shape different colours of light to simultaneously illuminate the same selected portion of a surface of said optical component 805 under inspection using the different colours of light at different incident angles. In this instance, the illumination device 840 is configured to shape or pattern blue light 840' and red light 840", the blue light 840 comprising an annulus or ring of light bordering a central spot of red light 840" as better seen in FIG. 18. It will be understood that different colours of light may be utilized and also different combinations and/or shapes of coloured light compared to those described herein.

The apparatus 810 includes first and second image capturing modules 820A,B and an optical element or beam splitter 870 for admitting one colour of light to the first image capturing module 820A and directing a second colour of light to the second image capturing module 820B. In this instance, the optical element or beam splitter 870 admits the red light 840" to the first image capturing module 820A and directs the blue light 840' to the second image capturing module 820B. As such, the optical element or beam splitter 870 acts as a bandpass filter to admit the red light 840" to the first image capturing module 820A, but acts as a bandstop filter to prevent the blue light 840' passing to said first image capturing module 820A. The optical element or beam splitter 870 may have a mirrored surface facing the support 830, the mirrored surface configured to act as a bandpass for the red light 840", but to reflect the blue light 840 towards the second image capturing module 820B.

In this embodiment, it is possible to perform two inspection stages simultaneously using respective colours of shaped or patterned light. Furthermore, it enables the first and second image capturing modules 820A,B to capture a bright field image for said selected portion of the surface of said optical component 805 when illuminated by one of the colours of light and a dark field image for said same selected portion of the surface of said optical component 805 when illuminated by another different one of the colours of light. The first image capturing module 820A captures a bright field image of the optical component 805 based on the red light 840" and the second image capturing module 820B captures a dark field image of the optical component 805 based on the blue light 840'.

Figure 17:
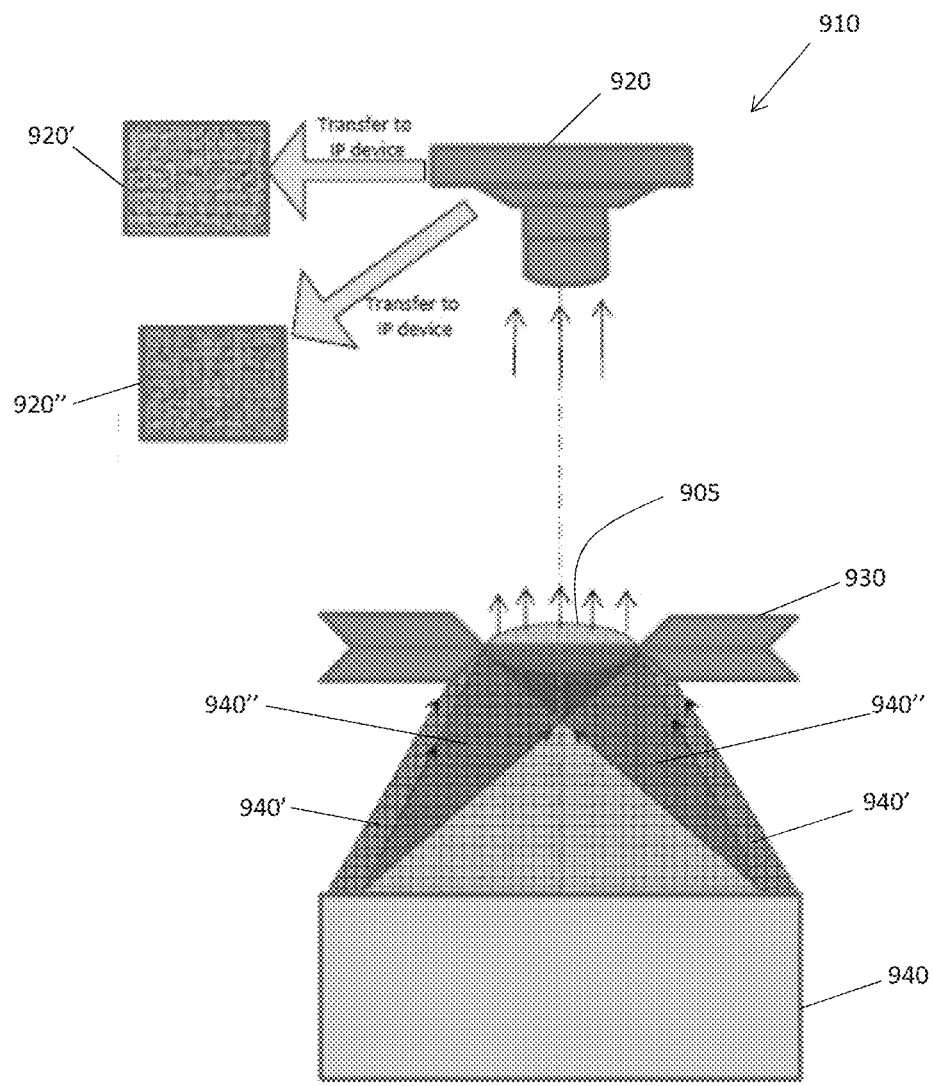
FIG. 17 is a schematic diagram showing a ninth embodiment of the apparatus for inspecting a light transmissible optical component according to the present invention.

FIG. 17 is a schematic diagram showing an eighth embodiment of the apparatus for inspecting a light transmissible optical component according to the present invention. Like numerals to depict like parts shown in FIG. 1 are denoted by the same numerals, but preceded by a "9".

This embodiment of the apparatus 910 is adapted to provide similar functionality to that of the apparatus of FIG. 16, but requires a single image capturing module 920 to do so. In this embodiment, the image capturing module 920 is configured to take an image or images of both blue and red light colours 940', 940", and to split said image or images into a blue dark field image channel 920' for the blue light part of the captured image(s) and into a red bright field image channel 920" for the red light part of the captured image(s). In this embodiment, it is also possible to perform two inspection stages simultaneously using respective colours of shaped or patterned light, but without the need for an optical element or beam splitter device as required by the embodiment of FIG. 16.

In any of the apparatuses of the foregoing embodiments, the support may be movable along at least one of an x-, y- and z-coordinate axis thereby align and position a supported optical component in a suitable image capturing position or inspecting position.

In any of the apparatuses of the foregoing embodiments where one or more additional illuminators are provided, said additional illuminators may comprise any common visible light emitting sources such as incandescent light, fluorescent light, discharged lamp, gas discharged lamp, lasers, or light-emitting diodes (LED), etc., and each light emitting source may optionally be equipped with one or more diffusers for an uniform illumination.

In a method of the invention, it is possible to conduct an automated inspection of one or more light transmissible optical components using any of the apparatuses of the foregoing embodiments using the steps of positioning one or more light transmissible optical components in a support of said apparatus, actuating one or more illumination devices to illuminate one or more selected portions of a surface of said one or more light transmissible optical components with shaped or patterned light, capturing one or more images of the one or more light transmissible optical components under illumination by the shaped or patterned light, and analyzing the one or more images to identify a defect of the one or more light transmissible optical components being inspected.

The support in any of the apparatuses of the foregoing embodiments may further be adapted to support more than one light transmissible optical component in, for example, a linear or a circular arrangement, and the support may be movable or rotatable to align and position a respective one of the plurality of the optical components at a desired position relative to an image capturing module.

In any of the apparatuses of the foregoing embodiments, the bright and/or dark-field images captured by the image capturing module(s) may be taken at exposure times ranging from 10 ms to 500 ms, but preferably at 40 ms to 250 ms, possibly with a 10 ms interval. This accounts for the fact that, to cause defects to become visible for one region of an optical component, a certain level of exposure for said region may be required, but said level of exposure could cause other regions of the same optical component to be underexposed or overexposed. Consequently, it is preferable in some embodiments to use a sequence of changing exposures and, optionally, with other light settings to provide a full coverage for exposing all or most defects or defect types present at different locations of an optical lens sample, i.e. an optical component being inspected.

In any of the apparatuses of the foregoing embodiments, the SLM(s) may comprise an electronic display unit, such as but not limited to, a liquid crystal display (LCD) or an active-matrix organic light-emitting diode (AMOLED) display, although a person skilled in the art would appreciate that any other light emitting surfaces of different shapes and configurations may also be applicable. In some embodiments, the SLM may comprise a LCD or a AMOLED device adapted to display one or more uniform light pattern such as a striped or circled pattern, and preferably, a uniform white-colored pattern to detect amplitude defects. The SLM may further comprise a mechanical shutter with dark, matte-colored blinds facing the image capturing module to mechanically block off any parasitic illumination from the illuminating surface of the SLM when any additional illuminators, if present, are switched on.

Accordingly, in order to allow defects of different types, which might be located at different regions of an optical component, to be clearly observable, it is preferred that a sequence of images be captured for various configurations of the apparatus. The different configurations may include, but are not limited to, changing shutter speeds of the camera(s) (image capturing module(s)) and thus varying exposure times under the illumination of one or more of the illuminating devices and/or additional illuminators to thereby enable inspection of the optical component under one or more dark-field and bright-field illumination configurations. It may also include providing different shapes on the SLM to provide different angle configurations of the different illumination types. The option to inspect under dark-field and/or bright-field conditions at various illumination settings is particularly beneficial to allow defects of various types and sizes, as well as defects at different regions of the lens, be revealed at suitable contrasts and brightnesses.

The apparatuses of any of the embodiments of the present invention may further be applied in conducting an automated inspection of one or more light transmissible optical components. For example, after an automatic positioning of a light transmissible optical component, such as an optical lens, by adjusting at least one of the x, y or z-coordinate axes of the support to an appropriate image capturing position of the apparatus, one or more of the illumination devices and additional illuminators if present can be actuated sequentially, simultaneously in any combination, or selectively to provide different or varying illuminations to the optical lens for image capturing purposes. The images can thus be captured under different fields of illumination such as bright-field, dark-field or a combination of bright and dark fields to thereby reveal defects of different types at different locations of the optical lens at different contrasts. At each specific illumination setting, one or a sequence of images can be taken at changing camera shutter speeds to allow images of different exposures to be acquired for further inspection and analysis. The captured images may optionally be output, transferred, saved as digital data in one or more computer storage mediums and one or more databases, or be processed at any computer processing means at the time of or after the inspection. The inspection may then either be conducted manually by a skilled operative for a semi-automated process, or preferably automatically by one or more processors executing suitable computer software for a fully automated inspection process.

In any of the apparatuses of the foregoing embodiments, prior to the inspection of a plurality of optical lens by the apparatus, a trial run or a so-called "self-training" process may first conducted with an aim to determine one or more preferred settings or configurations of the apparatus for the inspection of, for example, a number of optical lenses with one specific structure or lens type. A process for the trial run may comprise loading an optical lens of a specific type at the support, optionally positioning the lens by adjusting one or more of the x, y and/or z-coordinate axes of the support to an appropriate image capturing position, actuating, one at a time, the illumination device(s) and, if present, any additional illuminator(s) in an arbitrary or a predetermined sequence, capturing test images under different illumination configurations, analyzing said test images to determine preferred settings illumination configurations for the specific type of lens and/or for specific types of defects.

The determined suitable or preferred settings may then be applied in a high volume inspection process by the apparatus being operated automatically under control of a processor to inspect a large number of optical components in the manner as herein before described.

The present invention is advantageous in that it provides a method, an apparatus and a system for inspecting a light transmissible optical component such as an optical lens and that the apparatus is configurable to allow both bright-field and dark-field inspections of the optical component, with a wide range of exposures as well as adjustable illuminating angles being easily achievable. This is particularly advantageous in allowing different types of defects located at different regions or areas of the lens to be identified, detected and/or inspected at various brightnesses and contrasts. The apparatus is also highly adaptive to different types, forms, and configurations of optical components. More than one apparatus can be operated as a system with multiple checking stations, for example, and orientated in different or reversed directions to allow both sides of an optical lens to be inspected. The present invention also provides a method of conducting a semi or fully automated inspection of light transmissible optical components using the apparatus as described. The automated inspection enables optical components to be automatically inspected so as to allow an inspection of optical components at high volume. The present invention provides an efficient and systematic way to inspect quality of light transmissible optical components, negating the need for manual or visual inspection. The inspection is reliable, objective and bias-free. The analysis of the captured images may further be implemented through a computer interface to further enhance efficiency of the process.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims hereof, any element expressed as a means for performing a specified function is intended to encompass any way of performing that function. The invention as defined by such claims resides in the fact that the functionalities provided by the various recited means are combined and brought together in the manner which the claims call for. It is thus regarded that any means that can provide those functionalities are equivalent to those shown herein.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art is referred to herein, such reference does not constitute an admission that it forms a part of the common general knowledge in the art.

The invention claimed is:

1. An apparatus for inspecting a light transmissible optical component, comprising:
    an image capturing module arranged on a first side of a support configured to hold a light transmissible optical component whilst it is being inspected; and
    an illumination device including a spatial light modulator for receiving light from a light source, the spatial light modulator being configured to shape light from the light source and to illuminate a selected portion of a surface of said light transmissible optical component with said shaped light to enable the image capturing module to capture any of a bright field image, a dark field image, or a combined bright field and dark field image of the light transmissible optical component being held by the support;
    wherein the illumination device includes a light focusing system configured to focus the shaped light from the spatial light modulator onto said selected portion of the surface of said light transmissible optical component, the light focusing system comprising any one of a holographic optical element (HOE), a diffractive optical element (DOE), a truncated cone optical element, a simple ring axicon, a compound axicon, or a microlens array which has a profile corresponding to a lenslet array and a main lens phase functions.

2. The apparatus of claim 1, wherein the illumination device is further configured to focus said shaped light on said selected portion of the surface of said light transmissible optical component to thereby illuminate said selected portion of the surface of said light transmissible optical component.

3. The apparatus of claim 1, wherein the illumination device includes the light source.

4. The apparatus of claim 1, wherein the illumination device is configured to shape different colours of light to illuminate respective selected portions of the surface of said light transmissible optical component.

5. The apparatus of claim 1, wherein the illumination device is configured to shape different colours of light to illuminate respective selected portions of the surface of said light transmissible optical component to enable the image capturing module to a bright field image for one of said selected portions of the surface of said light transmissible optical component and a dark field image for another of said selected portions of the surface of said light transmissible optical component.

6. The apparatus of claim 1, wherein the selected portion of the surface of said light transmissible optical component comprises a whole of one light receiving surface of the light transmissible optical component.

7. The apparatus of claim 1, wherein the illumination device includes an optical projection system for projecting the shaped light towards a selected portion of the surface of said light transmissible optical component.

8. The apparatus of claim 7, wherein a focal length of the optical projection system is varied to thereby vary a dimension of the shaped light to illuminate respective different selected portions of the surface of said light transmissible optical component.

9. The apparatus of claim 1, wherein the illumination device is controlled to successively vary a dimension of the shaped light to illuminate said selected portion of the surface of said light transmissible optical component at different incident angles to enable the image capturing module to successively capture any of a bright field image, a dark field image, or a combined bright field and dark field image of the light transmissible optical component being held by the support for each of the successive variations of the dimension of the shaped light.

10. The apparatus of claim 9, wherein the illumination device is configured to shape light from the light source to provide a ring of light for illuminating said selected portion of the surface of said light transmissible optical component and to successively vary a diameter of said ring of light to successively illuminate said selected portion of the surface of said light transmissible optical component at different respective incident angles.

11. The apparatus of claim 10, wherein the illumination device is configured to successively vary the diameter of said ring of light to provide respective concentric rings of light to illuminate said selected portion of the surface of said light transmissible optical component at different respective incident angles.

12. A system for inspecting a light transmissible optical component comprising two or more apparatuses arranged in a same orientation or different orientations relative to one another, wherein each apparatus comprises:
    an image capturing module arranged on a first side of a support configured to hold a light transmissible optical component whilst it is being inspected; and
    an illumination device including a spatial light modulator for receiving light from a light source, the spatial light modulator being configured to shape light from the light source and to illuminate a selected portion of a surface of said light transmissible optical component with said shaped light to enable the image capturing module to capture any of a bright field image, a dark field image, or a combined bright field and dark field image of the light transmissible optical component being held by the support;
    wherein the illumination device includes a light focusing system configured to focus the shaped light from the spatial light modulator onto said selected portion of the surface of said light transmissible optical component, the light focusing system comprising any one of a holographic optical element (HOE), a diffractive optical element (DOE), a truncated cone optical element, a simple ring axicon, a compound axicon, or a microlens array which has a profile corresponding to a lenslet array and a main lens phase functions.

13. A method of conducting an automated inspection of a light transmissible optical component using an apparatus comprising an image capturing module arranged on a first side of a support configured to hold a light transmissible optical component whilst it is being inspected and an illumination device including a spatial light modulator for receiving light from a light source, the spatial light modulator being configured to shape light from the light source and to illuminate a selected portion of a surface of said light transmissible optical component with said shaped light to enable the image capturing module to capture any of a bright field image, a dark field image, or a combined bright field and dark field image of the light transmissible optical component being held by the support, the illumination device including a light focusing system, the method comprising the steps of:
  positioning a light transmissible optical component in said support;
  actuating the illumination device to illuminate a selected portion of a surface of said light transmissible optical component with said shaped light;
  capturing one or more images of the light transmissible optical component under illumination by the shaped light;
  automatically analyzing the one or more images to identify a defect of the light transmissible optical component being inspected; and
  using the light focusing system to focus the shaped light from the spatial light modulator onto said selected portion of the surface of said light transmissible optical component, the light focusing system comprising any one of a holographic optical element (HOE), a diffractive optical element (DOE), a truncated cone optical element, a simple ring axicon, a compound axicon, or a microlens array which has a profile corresponding to a lenslet array and a main lens phase functions.

14. An apparatus for inspecting a light transmissible optical component, comprising:
  an image capturing module arranged on a first side of a support configured to hold a light transmissible optical component whilst it is being inspected; and
  an illumination device configured to shape light from a light source and to illuminate a selected portion of a surface of said light transmissible optical component with said shaped light to enable the image capturing module to capture any of a bright field image, a dark field image, or a combined bright field and dark field image of the light transmissible optical component being held by the support;
  wherein the illumination device is controlled to successively vary a dimension of the shaped light to illuminate said selected portion of the surface of said light transmissible optical component at different incident angles to enable the image capturing module to successively capture any of a bright field image, a dark field image, or a combined bright field and dark field image of the light transmissible optical component being held by the support for each of the successive variations of the dimension of the shaped light; and
  wherein the illumination device includes a spatial light modulator and a light focusing system configured to focus the shaped light from the spatial light modulator onto said selected portion of the surface of said light transmissible optical component, the light focusing system comprising any one of a holographic optical element (HOE), a diffractive optical element (DOE), a truncated cone optical element, a simple ring axicon, a compound axicon, or a microlens array which has a profile corresponding to a lenslet array and a main lens phase functions.

15. A system for inspecting a light transmissible optical component comprising two or more apparatuses arranged in a same orientation or different orientations relative to one another, wherein each apparatus comprises:
  an image capturing module arranged on a first side of a support configured to hold a light transmissible optical component whilst it is being inspected; and
  an illumination device configured to shape light from a light source and to illuminate a selected portion of a surface of said light transmissible optical component with said shaped light to enable the image capturing module to capture any of a bright field image, a dark field image, or a combined bright field and dark field image of the light transmissible optical component being held by the support;
  wherein the illumination device is controlled to successively vary a dimension of the shaped light to illuminate said selected portion of the surface of said light transmissible optical component at different incident angles to enable the image capturing module to successively capture any of a bright field image, a dark field image, or a combined bright field and dark field image of the light transmissible optical component being held by the support for each of the successive variations of the dimension of the shaped light; and
  wherein the illumination device includes a spatial light modulator and a light focusing system configured to focus the shaped light from the spatial light modulator onto said selected portion of the surface of said light transmissible optical component, the light focusing system comprising any one of a holographic optical element (HOE), a diffractive optical element (DOE), a truncated cone optical element, a simple ring axicon, a compound axicon, or a microlens array which has a profile corresponding to a lenslet array and a main lens phase functions.

16. A method of conducting an automated inspection of a light transmissible optical component using an apparatus comprising an image capturing module arranged on a first side of a support configured to hold a light transmissible optical component whilst it is being inspected and an illumination device configured to shape light from a light source and to illuminate a selected portion of a surface of said light transmissible optical component with said shaped light to enable the image capturing module to capture any of a bright field image, a dark field image, or a combined bright field and dark field image of the light transmissible optical component being held by the support, the illumination device including a spatial light modulator and a light focusing system, the method comprising the steps of:
  positioning a light transmissible optical component in said support;
  successively varying a dimension of the shaped light to illuminate the selected portion of the surface of said light transmissible optical component at different incident angles to enable the image capturing module to successively capture any of a bright field image, a dark field image, or a combined bright field and dark field image of the light transmissible optical component being held by the support for each of the successive variations of the dimension of the shaped light;

capturing a plurality of images of the light transmissible optical component under illumination by the shaped light;

automatically analyzing the plurality of images to identify a defect of the light transmissible optical component being inspected; and using the light focusing system to focus the shaped light from the spatial light modulator onto said selected portion of the surface of said light transmissible optical component, the light focusing system comprising any one of a holographic optical element (HOE), a diffractive optical element (DOE), a truncated cone optical element, a simple ring axicon, a compound axicon, or a microlens array which has a profile corresponding to a lenslet array and a main lens phase functions.

* * * * *